Nov. 10, 1931.     R. LAPSLEY     1,830,797
TRANSMISSION
Filed June 27, 1930     5 Sheets-Sheet 1

Inventor
Robert Lapsley
By Brown, Jackson, Boettcher & Dienner
Attys.

Inventor
Robert Lapsley

Nov. 10, 1931. R. LAPSLEY 1,830,797
TRANSMISSION
Filed June 27, 1930 5 Sheets-Sheet 3
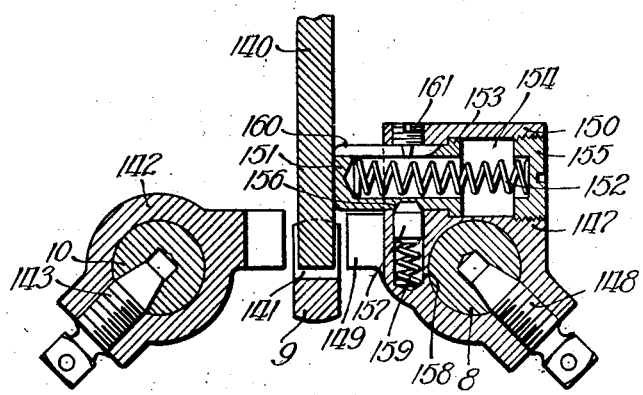
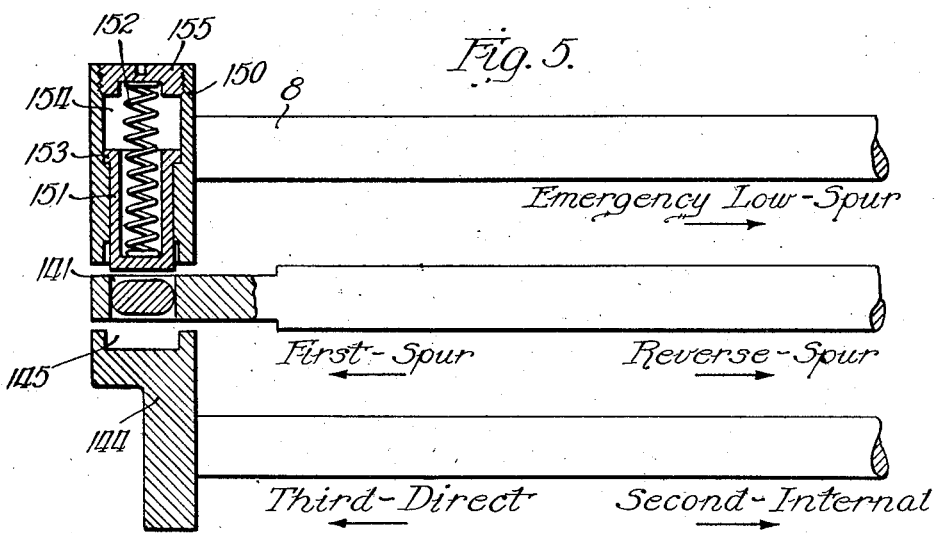
Inventor
Robert Lapsley

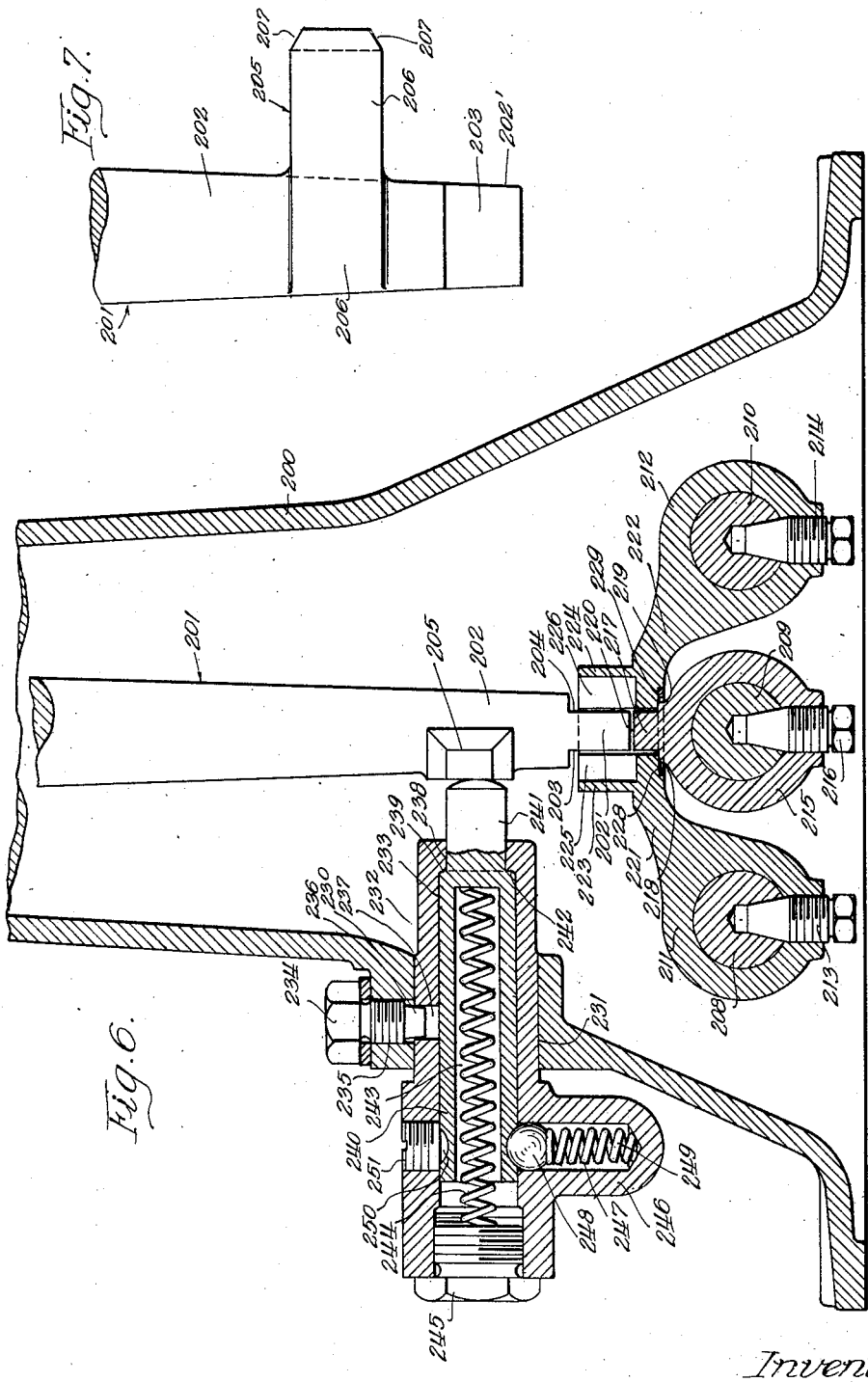

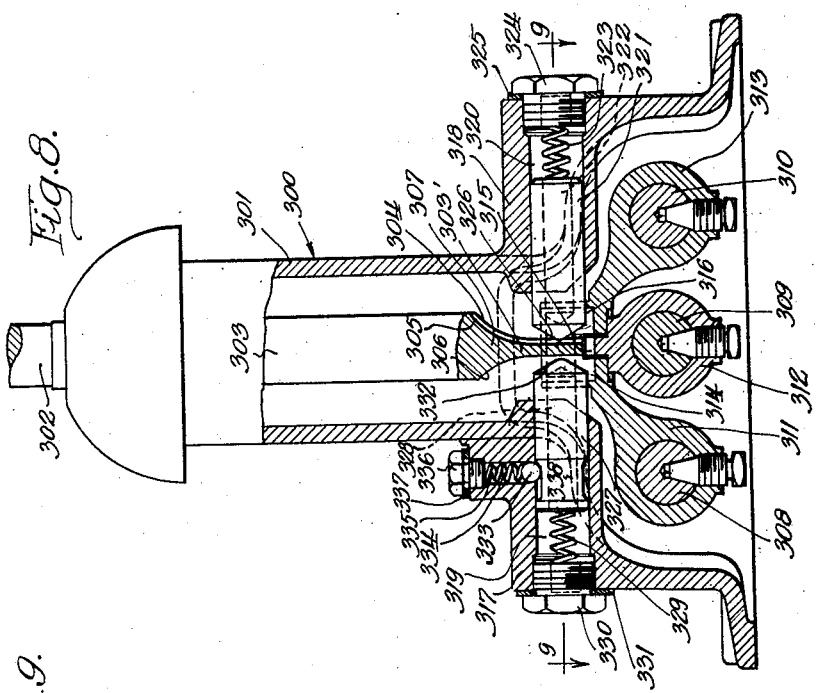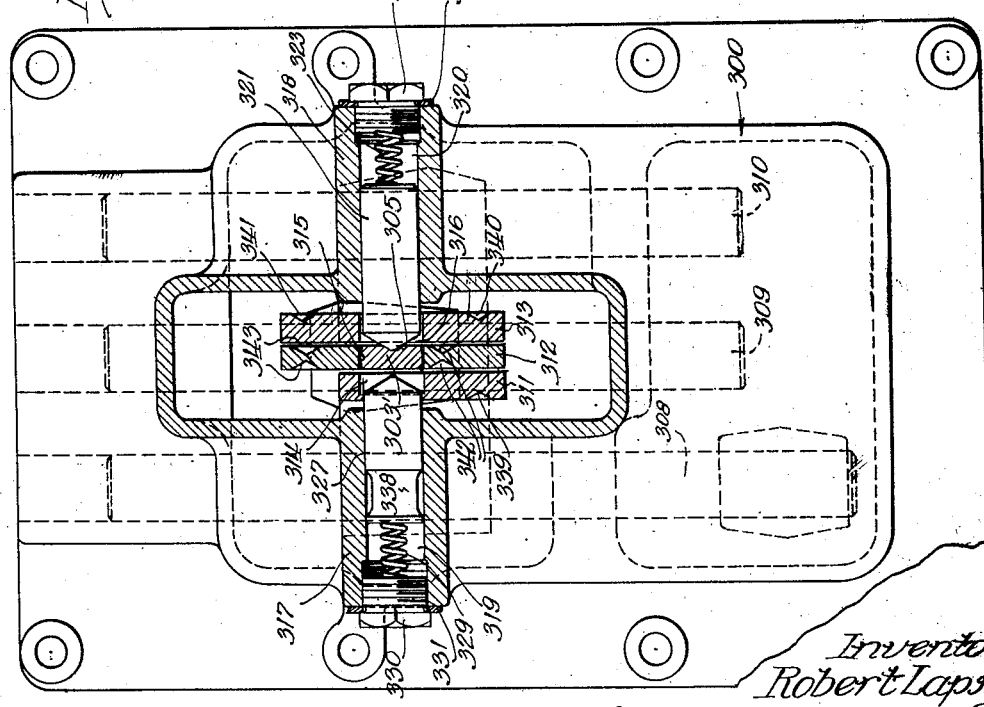

Patented Nov. 10, 1931

1,830,797

UNITED STATES PATENT OFFICE

ROBERT LAPSLEY, OF BERRIEN SPRINGS, MICHIGAN, ASSIGNOR TO CLARK EQUIPMENT COMPANY, OF BUCHANAN, MICHIGAN, A CORPORATION OF MICHIGAN

TRANSMISSION

Application filed June 27, 1930. Serial No. 464,185.

This invention relates to the transmissions for automobiles and the like, and is more particularly concerned with a gear shifting structure for a transmission of the character disclosed in my co-pending application for Transmission, Serial No. 333,686, filed January 19, 1929, of which this application is a continuation-in-part. It is to be understood however that the particular arrangement of gear shifter rods and lever is not to be confined to my specific form of transmission, but may be employed for general purposes.

In the above noted application I have disclosed a transmission in which the casing is simplified and reduced in cost of manufacture wherein nothing but simple concentric bores are required in the casing, these bores being of progressively varying diameters, so that they may all be finished at a single operation if desired. By the provision of such a casing, eccentric bores which heretofore involved particularly difficult machining operations where both eccentric and concentric bores were required to be machined have been eliminated. This is accomplished by breaking the casing and bearing supports or brackets into two separate elements which have as their line of cleavage a concentric bore which is preferably cylindrical, thus providing a satisfactory concentric seat for the eccentric bearing element or bearing brackets. The eccentric bearing element or bracket has an outside cylindrical face to enter the corresponding seat in the casing and has two internal eccentric bores forming bearings or bearing seats. This construction permits of the securement of another important advantage heretofore unattainable, that is, to support the internal gear sleeve externally at both ends in solid bearings with the center line of the gear teeth of sleeve, both internal and external, lying between the supporting bearings thus eliminating overhang of the gears. The bearing bracket is preferably made of steel suitable to receive the roller bearings which support the internal external gear sleeve being of a suitable character to be hardened and ground to form the outer bearing recess.

The strength thus provided is highly desirable for permitting the supporting ring or race for the rearmost eccentric bearing to be supported through a crescent-shaped opening between the gear sleeve and the large internal gear.

A further feature of importance of this invention is the provision of a system of oiling the internal external gear assembly and the bushing for the loose pinion for the first internal gear. The low speed pinion and the low speed gear on the lay shaft carry oil into a housing which tends to trap the oil and feed it into the internal external gear assembly and the bearings and gears thereof. Oil is also constantly fed to the bushing or bearing of the loose gear pinion on the intermediate shaft which is subject to motion much of the time.

Another feature of importance in this invention is in the provision of an improved mounting and manner of positioning the loose pinion for the first internal gear of the internal external gear assembly. The mounting supports this pinion adjacent and at the same time free or independent of the shiftable intermediate shaft section.

A very desirable feature of my invention is the provision of an easy and compact assembly wherein direct drive is carried straight through on roller bearings.

Transmissions of the so-called four-speed internal gear type are now employed and they generally provide two stages of spur gears for acceleration, and a stage of internal gear and a direct drive for continuous running. While in the preferred form of my invention I provide a like number of driving ratios, the transmission stages or ratios are arranged on a different theory. The lowest stage or ratio of spur gears is not intended to be employed for acceleration in normal driving, but is an emergency low gear for heavy duty pulling. The second gear stage is a spur gear drive and is employed for starting and acceleration, this drive corresponding to the usual first gear of known standard spur gear transmissions. The third stage is an internal gear drive which is used both for an accelerating gear to the direct drive, or it may be used as a continuous drive at a ratio permitting of rapid acceleration in traffic.

In conjunction with this mode of arranging the gears, I have provided a novel control. The gear shift is the standard for low, reverse, intermediate (internal) and high (direct).

This novel control feature for the operation of the emergency low speed forms the subject matter of the instant application.

Heretofore, it has been customary in providing for the operation of an emergency low speed in a transmission or any other special connection such as reverse speed which is normally out of selective position, to provide a manually operable detent means controlled by the thumb or fingers of an operator for purposes of enabling the shifter lever to be moved to engage a shift rod operatively associated with the shifting element which is out of the normal selective positions of the transmission. In accordance with the instant invention these additional manually operable elements normally requiring additional attention on the part of the operator have been eliminated thus simplifying the operation of the transmission when shifting to the special connection when desired.

With the above in view it is an object of this invention to provide a transmission with a novel means for permitting the shifting of the elements of the transmission for special connections therein requiring only a simple shifting of the gear shift lever. To this end, the shift rod controlling the special connection, in the instant case emergency low, has been provided with a body portion having a pocket normally in alignment with a pocket in the shift rod controlling first and reverse speeds when the shifter lever is in neutral position.

The body is provided with a normally spring pressed plunger positioned in a circular bore in the body portion and having a flange or rim at its rear end to limit its outward movement so that the outer end of the plunger lies normally in a position in proximity to the lateral side of the lower end of the shift lever. One side of the plunger is provided with a conical recess in which a conical ended plunger pin is normally spring projected and seated to yieldingly restrain the plunger from moving to retracted position. A guiding pin positioned in the body portion in diametrically opposed relation to the conical ended plunger pin extends into a longitudinal peripheral groove in the plunger to prevent turning of the plunger thereby keeping the conical recess in line with the conical ended plunger pin. Thus the gear shift lever must be pressed against the end of the spring plunger with a force not only great enough to overcome the spring pressure of its spring but also to force the conical ended pin downwardly out of the conical recess. This is best accomplished by a sharp movement of the lower end of the shift lever against the free end of the plunger whereupon the lower end of the shift lever may be received in the pocket provided in the body portion thereby permitting operation of the shift rod controlling the emergency low speed or other special connections.

Another object is the provision of a novel means whereby the shift lever will be automatically ejected from connection with the shift rod controlling the emergency low speed or other special connection when the shift lever is moved to neutral position. When the plunger above described has been forcibly retracted by the engagement of the free end thereof by the lower end of the shift lever and the lower end of the lever has been received by the pocket formed in the body portion and the shift rod has been moved to complete the desired emergency low or other special connection, the lever is retained in the pocket by the engagement of the side thereof opposite to the side engaged by the plunger against the side of the shift rod controlling the normal first and reverse spur gear connections. In this condition, lateral spring pressure is always applied to the shift lever as long as the emergency low or other special connection is employed. When the shift lever is moved to return the emergency low or other special connection to neutral position, thus bringing about an alignment of the pocket in the body portion and the pocket in the shift rod controlling the normal first and reverse spur connections, the lever will be automatically ejected from the pocket in the body portion into the pocket in the shift rod controlling the normal first and reverse spur connections.

Thus, by the provision of this novel feature in the control elements, there is a positive expulsion of the lower end of the shift lever from the emergency or other special connection controlling shift rod involving merely a movement of the shift lever to neutral position whereupon the normal operating speeds of the transmission may be then employed without involving any other manipulation by the operator than the movement of the shift lever to neutral position.

A further object is the provision of a novel arrangement of a plurality of plungers associated with the shift rods of a transmission in such a manner as to positively lock such rods as are in neutral position so that no accidental shifting of such rods will take place while the selected rod is being moved to operative and inoperative condition. At the same time, the arrangement is such that the locking means employed acts as a double acting shift rod interlock for the rod which has been shifted to a selected position. As in the case of the embodiment of the invention heretofore briefly described, it is desirable to employ such an arrangement of parts as will require a minimum amount of effort on the part of an operator. To this end, the present arrangement is such that, as in the previous case, the lock means may be simply, quickly and readily operated by a mere quick movement of the shift lever in the direction of movement thereof to cause the desired gear shift change. Briefly, the contemplated structure comprises a pair of oppositely disposed spring projected plungers, normally urged toward each other. The lower end of the shift lever is, in the neutral position of all the shift rods, disposed between the adjacent ends of the plungers. In such neutral position the plungers extend through the notches in the clutch collars of such shifter rods as are disposed on opposite sides of the lever thereby locking such rods until withdrawal movement of the plungers is caused by movement of the shift lever. Once either plunger is moved out of its respective notch, the other plunger is further projected automatically into the intermediately disposed shift rod clutch collar notch, thereby locking such shift rod. At such time, the plunger which has been moved out of engagement with its respective shift rod collar may frictionally engage suitable shallow notches in such collar to yieldingly retain such rod from movement thus operating as a shift rod interlock. When the shift lever is again brought to neutral position, the plunger automatically ejects the lever to its normal, neutral position, thereby automatically locking its respective shift rod. Thus, the structure embodies not only a locking feature for the shift rods but also provides a shift rod interlock.

Other and further objects will appear from the following detailed description of a preferred embodiment of my invention illustrated in the accompanying drawings in which:

Figure 4 is a fragmentary section taken along the line 4—4 of Figure 1;

Figure 5 is a fragmentary plan view, partly in section, of the shifter rods;

Figure 6 is a vertical section through the upper portion of a transmission casing illustrating a modified form of my invention;

Figure 7 is a fragmentary side elevation of the lower end of the shift lever employed in conjunction with the modified form of my invention illustrated in Figure 6;

Figure 8 is a section similar to that of Figure 7, showing a further embodiment of my invention applied to provide a shift rod lock and interlock; and Figure 9 is an enlarged sectional view taken substantially along the line 9—9 of Figure 8.

Figure 1:
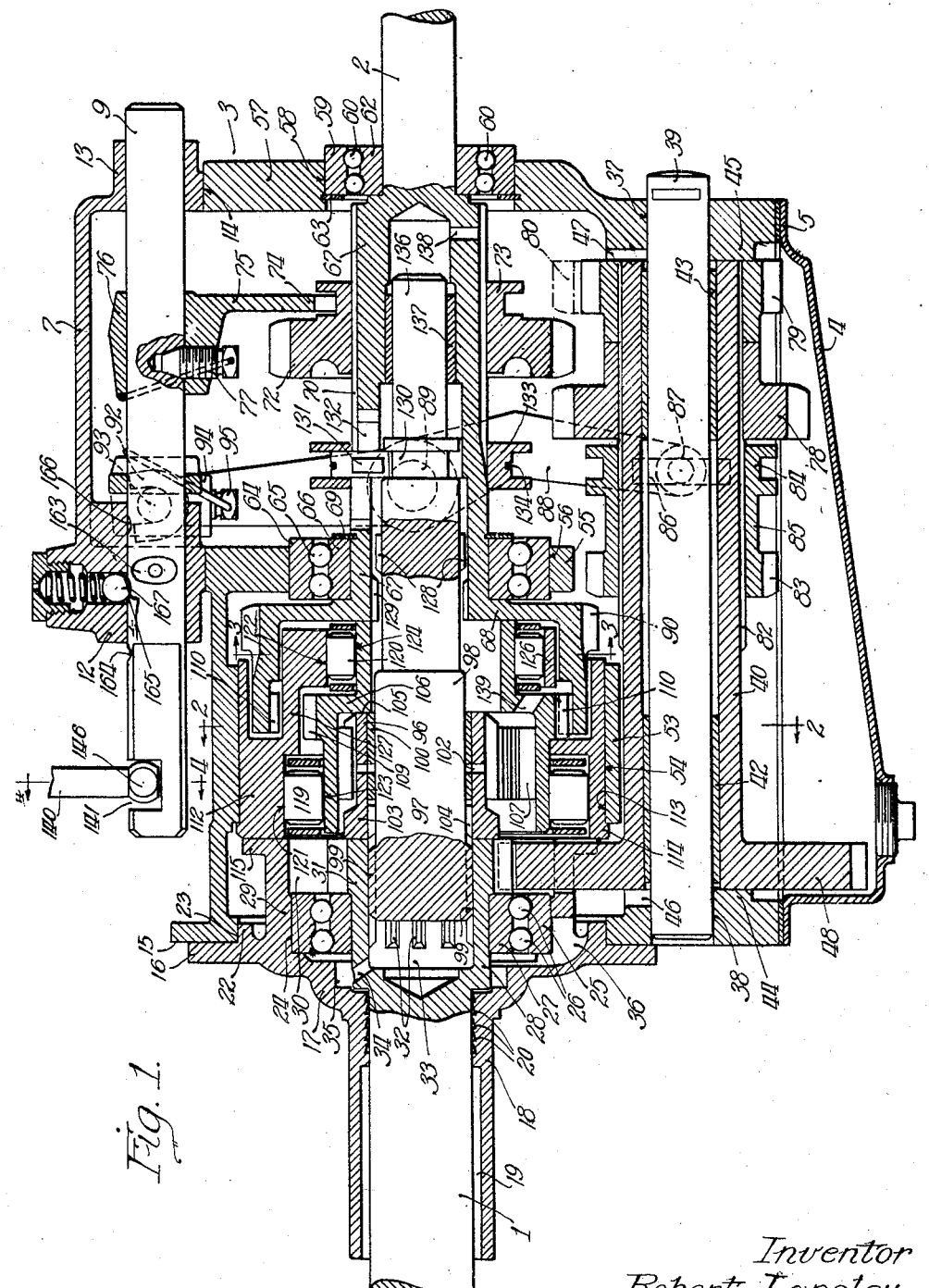
Figure 1 is a longitudinal vertical section through a transmission embodying my invention.

Although this application is concerned only with the gear shifting structure, for the sake of clarity certain other parts of the particular transmission shown, will be described.

The shaft 1 is adapted to be driven by the engine through the interposition of a suitable clutch or the like. The shaft 2, which extends out of the rear end of the main housing 3, is adapted to be connected to the propeller shaft of the automobile or other vehicle, or the like. Five possible driving connections can be made through the transmission, namely, an emergency low drive, which provides a maximum gear reduction in the transmission, and which is to be used only in pulling out of a hole or pulling a heavy load. The next drive is through what is known as first speed, which is a spur gear reduction less in amount. Next is an internal gear reduction through a double internal drive corresponding to second speed. This is of less reduction than the previous reduction and is suitable for continuous drive, if desired.

There is a direct drive or high speed drive in which the shafts 1 and 2 are connected together at a 1 to 1 ratio by direct connection. This corresponds to normal high or direct drive. In addition, there is a reverse drive including a gear reduction preferably lying between the emergency low and the first gear.

The main casing 3 is open at the bottom where a suitable pan 4 of sheet metal is provided. This pan has a flange 5 about the edge thereof to adapt it to be bolted to the bottom of the transmission housing 3, this transmission housing having a suitable flat space and including flanges, such as 6—6 along the sides (see Figure 2). The opening in the bottom permits the lay shaft sleeve and gears to be introduced from the bottom. The casing 3 has an opening at the top which is faced off to receive the cover plate 7, containing the three shifter rods 8, 9 and 10, said shifter rods being suitably guided in bearings at the front and rear of the cover plate 7, as indicated at 12 and 13 in Figure 1. The joint at 14 between the cover plate 7 and the main housing 3 is made preferably by bolting the parts together, the joining surface being a plane.

The main housing 3 is faced off flat at the front end, as indicated at the surface 15, to provide a joint between it and the flange 16 of the front cap 17. This cap 17 has a tubular sleeve 18 extending forwardly about the shaft 1. It may contain a felt or like packing in the annular recess 19, and is provided with oil trapping grooves 20 at the inner end. The cap 17 has an inwardly extending cylindrical flange 22, and this flange is machined on its outer peripheral surface to fit within the bore 23 in the front wall of the casing 3.

An internal cylindrical seat 24 is adapted to receive the outer race 25 for the ball bearings 26, the inner race of the bearings embracing the enlargement 28 of the shaft 1. The cap 17 has an inwardly extending wall 29 forming a housing 30 about the bearings 26 and the low speed pinion 31, which is formed as an integral part of the inner end of the driving shaft 1. The inner end of the driving shaft 1 is bored out and splined, as indicated at 32, the bore 33 communicating by way of one or more drilled passageways 34 with the annular recess 35 in the cap 17, which recess communicates with the ball bearings 26 and communicates through a cored passageway 36 with the lower part of the casing 3, to permit lubricant, such as heavy oil, which is employed within the case, to drain back towards the bottom of the case.

The lower part of the main casing 3 has horizontal bores at 37 and 38 to receive the rod or shaft 39 which supports the lay shaft sleeve 40. The lay shaft sleeve 40 has a bronze bushing 42 at its front end embracing the rod 39 and forming a bearing thereupon. In like manner the rear end of the lay shaft sleeve 40 has a bronze bushing 43 providing a bearing on the rod 39 at the rear end of the sleeve.

The sleeve 40 is guided endwise by the bosses 44 and 45, passageways, however, being provided at 46 and 47 to permit the entry of oil to said bushings 42 and 43 to keep the same thoroughly lubricated.

Figure 2:
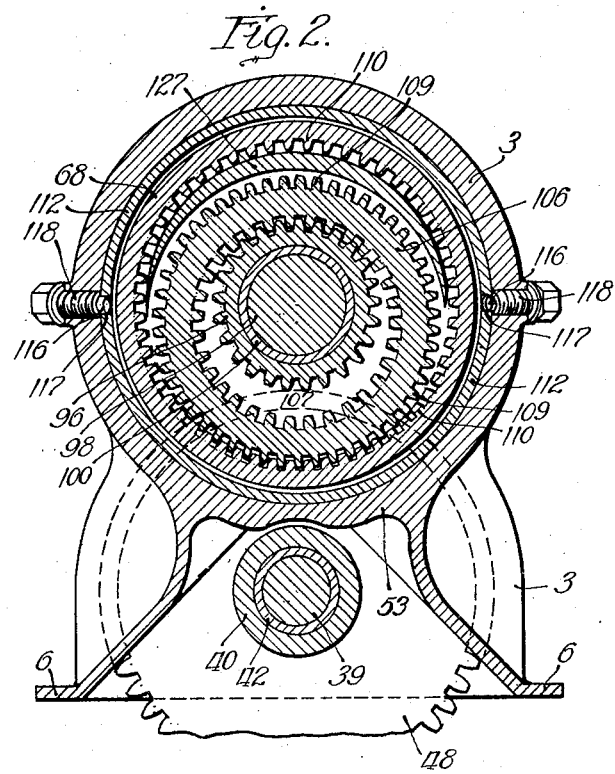
Figure 2 is a transverse section taken along the line 2—2 of Figure 1.

The lay shaft sleeve 40 bears at its front end the integral low speed gear 48 which meshes with the low speed pinion 31. The upper end of the low speed gear 48 projects up through the bottom of the housing 30 provided by the flange 29 as shown in Figure 2, the flange being continuous over the upper part of the low speed pinion 31 and extending in close proximity, as indicated at 49 in Figure 2, to the tips of the teeth on the low speed gear 48. The other end of the flange 29 extends to a point slightly further from the line of the teeth on the low speed gear 48 to provide an inlet passageway for oil to be carried up by the low speed gear and trapped in the housing 30. The flange 29 has an extension (not shown) approaching the shell of the main case 3, so as to facilitate the carrying of oil by the gear 48 up into the housing 30 about the low speed pinion 31.

The main casing 3 has an integral bracket 53 which is bored out on a concentric bore 54 with the bore 23 and of slightly smaller diameter than the bore 23. The main casing 3 also includes the bearing bracket 55, which is bored out on a cylindrical bore 56 concentric with the bores 54 and 23. The rear wall 57 of the main housing 3 is bored out with a cylindrical concentric bore 58 to receive the outer race 59 of the ball bearings 60, the inner race 62 of which supports the rear end of the driven shaft 2.

A suitable flanged cap or plate holds the outer race 59 against a spring expanding plate ring 63, which is seated in a groove in the bore 58. The bearing bracket 55 supports the outer race 64 of the bearings 65, the inner race of which 66 embraces the tubular sleeve 67, which tubular sleeve forms an extension of the driven shaft 2 and bears at its inner end the internal external gear member 68. The said inner race 66 is held in place by a snap ring 69, the other side of the race 66 resting against the radially extending portion.

The rear end of the sleeve member 68 is splined as indicated at 70 to receive the shiftable gear 72 which is likewise splined and movable axially on the sleeve member 67. The gear member 72 has a shifter collar 73 engaged by the shifter fork 74 formed on the shifter arm 75, the hub 76 of which is pinned as by the taper screw pin 77 upon the sliding shifter rod 9. The lay shaft sleeve 40 carries at its rear end two pinions 78 and 79. Pinion 78 has teeth which are adapted to be engaged by the teeth of the shifting gear 72 for transmitting drive from the lay shaft 40 to the driven shaft 2. The pinion 79 is in constant mesh with the idler pinion 80, which idler pinion 80 is so disposed as to have its pitch circle tangent to the pitch circle of the shifting gear 72, so that the shifting gear 72 and idler pinion 80 may be meshed for reverse drive of the driven shaft 2.

The lay shaft sleeve 40 is provided with splines 82 upon which is mounted the pinion 83, said pinion having a shifting collar 84 integral with the hub 85. A shifter finger 86, shown in dotted lines in Figure 1, is pivotally mounted at 87 on the lower arm of a shifter lever 88. This finger 86 lies in the groove in the shifter collar 84 and is adapted to move the teeth of the gear 83 endwise into or out of mesh with the gear teeth of the external gear 90 on the member 68.

The shifter lever 88 is pivoted at 89 to the side wall of the casing, and the upper arm of said lever 88 is connected by a fork 92, shown in dotted lines in Figure 1, with a pin 93 mounted on the shifter rod 8. The shifter rod 8 lies back of the shifter rod 9 in Figure 1. The pin 93 is mounted upon a hub member 94 which is connected to the rod by the taper screw pin 95.

A driving pinion 96, lying axially in line with the low speed pinion 31, is journaled upon the enlarged cylindrical part 97 of intermediate shaft 98. This intermediate shaft 98 has splines 99 at its front end meshing at all times with the splines 32 on the inside periphery of the hollow part of the driving shaft 1. The pinion 96 is mounted upon the bushing 100, preferably of bronze or other anti-friction metal, and an oil duct or passageway 102 is drilled through the pinion 96 and through its bushing 100 to permit oil to be forced to the inside of the bushing 100.

Figure 3:
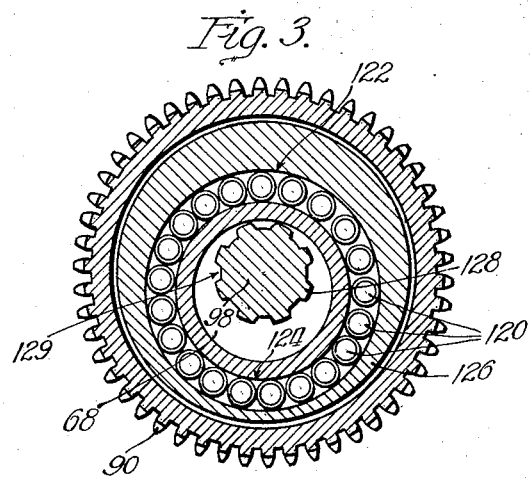
Figure 3 is a transverse cross-section taken along the line 3—3 of Figure 1.

The pinion 96 has a collar 103 at its forward end, which collar is adapted to engage endwise against the end of the low speed pinion 31. Internally, the collar 103 has splines 104 which are adapted to be engaged by the splines 99 on the forward end of the intermediate shaft 98. At its rear end the pinion 96 engages the radial face 105 of the internal external gear sleeve 106. This internal external gear sleeve 106 has an internal gear 107 disposed between its forward edge and the radial face 105. The teeth of the gear 107 mesh with the teeth of the pinion 96 at all times, the sleeve member 106 being eccentrically mounted so as to bring the pitch circle of the gear 107 tangent to the pitch circle at the top of the pinion 96, as will be apparent from an inspection of Figures 1 and 3.

The sleeve member 106 is provided with an external gear 109, the teeth of which mesh with the teeth of the internal gear 110 mounted on the member 68. The mesh of these two gears 109 and 110 is at the bottom. The member 68, and hence the gear 110, being integral with the driving shaft 2, it can be seen that when the splines 99 of the intermediate shaft 98 are slid into mesh with the splines 104 on the inside of the collar 103 of the pinion 96, a double internal gear reduction is secured as between the driving shaft 1 and the driven shaft 2.

The eccentric support for the member 106 is provided by the supporting bracket member 112. This member 112 comprises a cylindrical body of metal having a peripheral cylindrical face 113 matching the cylindrical bore 54 of the integral bracket member 53 in the case 3. The member 112 has a slight shoulder 114 which located the member 112 accurately endwise in the integral bracket 53. The shoulder or flange 114 is of a diameter large enough to be passed through the bore 23 in the front wall of the gear housing 3. The member 112 fits snugly in the bore 54 and is held in place by the extending flange 115 on the rear end of the circular flange 29, which is a part of the cap member 17.

The member 112 is held against rotation by a pair of pins 116 engaging in recesses 117 in the member 112, said pins being mounted on the ends of screws 118. The screws 118 are shown as being positioned diametrically opposite and are preferably threaded obliquely rearwardly through the case 3 with the pins or ends 116 directed obliquely rearwardly into the recesses 117 and adapted for holding the shoulder 114 of member 112 against the end of bracket 53 or at least against unintentional outward displacement.

This bracket member 112 is preferably made of a high grade alloy steel so as to be capable of serving as a race for the roller bearings 119 and 120 which lie directly between the finished internal surfaces 121 and 122 and the finished cylindrical external surfaces 123 and 124 on the sleeve member 106.

The one-piece bracket member 112, at its forward part, comprises a concentric ring, thicker at the top than at the bottom, and at its rear part comprises a ring of even thickness all the way around. Intermediate these parts there is a concentric bore in which the external gear 109 of the member 106 lies.

It will be seen that there is a crescent-shaped opening or space between the external gear 109 and the internal gear 110 (see Figures 1 and 2). The eccentric ring 126, which provides the internal bearing ring surface 122, is supported by the solid crescent-shaped bracket portion 127 of the member 112. While the thickness of the said bracket portion 127 is not great, the crescent shape, thereof and the character of the material, i. e., high grade alloy steel, provide ample strength for supporting the eccentric bracket ring 126 forming the outer bearing race for the roller bearings 120.

The intermediate shaft 98 has splines 128 along its central portion which are of an outer diameter not greater than the large cylindrical portion of 98. These splines are adapted to engage cooperating splines 129 formed on the inside of the sleeve member 67 upon which the internal external large gear member 68 is formed.

The intermediate shaft 98 has a shifting groove 130 lying inside the hollow sleeve member 67.

This groove 130 is engaged by a pin 131 extending through a hole in a shifter collar 133 and through a slot 132 in the sleeve member 67. The pin 131 is slabbed off at the sides to engage the side walls of the slot 132 to keep the same from rolling or turning. The pin is held in position by a wire or rivet 134 lying in a small groove in the bottom of the groove of the shifter collar. The pin obviously may be threaded into the shifter collar 133.

A shifter fork, like the fork 74 and arm 75, is mounted on the rod 10, said fork being engageable with the groove in the collar 133 and, by movement endwise of the rod 10, being capable of shifting the intermediate shaft 98 endwise to clutch together on motion to the left as viewed in Figure 1 the splines 128 and 129 for direct drive, or to clutch together the splines 99 and 104 by motion of the intermedite shaft to the right, as viewed in Figure 1.

The rear end of the intermediate shaft 98 has a reduced bearing portion 136 closely fitting in the bushing 137 mounted on the inside of the sleeve member 67.

The sleeve member 67, at its left hand end as viewed in Figure 1, opens into the inside of the internal external gear member 68, and at its righthand end is provided with one or more drilled holes 138 to permit of the entry and escape of lubricants. The level of lubricant in the casing 3 is normally just below the rear bearing 60. The gear sleeve 106 has one or more openings 139 drilled through the radial web thereof, as shown in Figure 1, for the passage of lubricant from the inside to the outside thereof, particularly for the purpose of passing lubricant to the roller bearings 120.

The shifter rods 8, 9 and 10 are adapted to cooperate with the lower end of the shifter lever 140, which is mounted in a suitable universal mounting intermediate its length. The lower end of the shifter lever 140 normally lies in the notch 141 in rod 9.

Shifter rod 10 has a clutch collar 142 secured thereupon by the tapered screw pin 143 and providing a lug 144 notched as at 145 to receive the knob 146 formed in the lower end of the shifter lever 140. The forward end of the rod 9, which contains the notch 141, is milled off, or slabbed off, so as to require a minimum of lateral travel of the lower end of the shifter lever 140.

The rod 8 has a collar 147 secured by the tapered screw pin 148 and comprising a lug or body portion extending towards the shifter rod 9 providing the notch 149. The body portion 150 has a circular bore in which lies the spring pressed plunger 151 said plunger being hollow to receive the compression spring 152 to throw the plunger 151 to a definite outward position towards the left, as viewed in Figure 4. The plunger 151 has a rim or flange 153 which lies in the counterbore 154, the rear end of the counterbore being closed by a screw plug 155. The forward or outward face of the plunger 151 extends just beyond the arm in which the notch 149 is formed, so that the gear shifter lever 140 is not able to engage in the notch 149 without displacing the plunger 151. The plunger 151 has a conical opening 156 into which a conical ended plunger pin 157 is normally forced and rests.

This pin 157 is guided in the vertical cylindrical bore 158 drilled into the body portion of the collar 147 and the spring 159 lies below the plunger pin 157. The main spring pressed plunger 151 is provided with a groove extending longitudinally thereof, and a guiding pin formed on the lower end of the screw plug 161 extends into said groove 160 and prevents turning of the main plunger 151, thereby keeping the conical recess 156 in line with the spring plunger pin 157.

Now it will be apparent that the gear shift lever 40 must be pressed against the spring plunger 151 with a force not only great enough to overcome the spring pressure of the spring 152, but also to force the conical pin 157 downwardly out of the conical recess 156. This is best done by a sharp movement of the lower end of the lever 140 against the spring plunger 151 to dislodge the pin 157 and to carry the lower end of the lever 140 over into the notch 149, so that the shifter rod 8 may be moved.

In Figure 5 I have shown the arrangement of the rods 8, 9 and 10 and have indicated by the legends the function which the movement of these rods performs. It is to be understood, however, that this arrangement of gear shifter rods and levers is not to be confined to my specific form of transmission, but may be employed for general purposes. For example, the shifter rod 8 may be employed for reverse only, and the rods 9 and 10 for first, second, third and fourth in a 4-speed transmission. The shifter rods are provided with suitable interlocks, as indicated at 163 in Figure 1, and notches such as 164, 165 and 166 into which a spring pressed ball 167 or plunger may rest for holding the rods yieldably in predetermined position.

It will be observed that for all except emergency low, the various stages conform in position and function to standard; i. e., the motions of the shifter lever for acceleration and reverse are standard.

The operation of the device is as follows:

Assuming that the parts are in the condition shown in Figure 1 and it is desired to employ the normal first speed or normal low gear drive. The shifter rod 9 is shifted to the left in Figure 1 to mesh the gear 72 with the pinion 78 on the lay shaft sleeve 40. The drive then proceeds from shaft 1, low speed pinion 31, low speed gear 42, sleeve 40, pinion 78 to gear 73, sleeve 67 and shaft 2. Rotation of the sleeve 67 drives the internal external gear member 68, and it in turn drives the gear sleeve and the gear sleeve drives the loose pinion 86 idling.

The second stage is secured by moving the shifter rod 9 back to neutral position, as shown in Figure 1, and shifting the shifter rod 10 to the right as viewed in Figure 6. This carries the collar 133 and the intermediate shaft therewith to the right, causing meshing of the splines 99 with the splines 104 on the loose pinion 96.

The drive then proceeds through shaft 1, splines 32, splines 99, splines 104, to the loose pinion. The loose pinion through internal gear 107 drives the sleeve member 106. The external gear 109 of the sleeve 106 meshes with the internal gear 110 of the member 68, which is mounted on the sleeve 67, thereby driving the sleeve 67 and the shaft 2. To go to high speed or direct drive, the shifter rod 10 is moved to the left, as viewed in Figure 1, to carry the splines 99 out of mesh with the splines 104, and thereafter to carry the splines 128 on the central part of the intermediate shaft into mesh with the splines 129 on the inside of the sleeve member 67. Direct drive then proceeds from the shaft 1 through the splines 32, splines 99, intermediate shaft 98, splines 128 to the splines 129 on the sleeve 67, and from thence through sleeve 67 to the driven shaft 2.

Reverse drive in the present case is accomplished from neutral position, as shown in Figure 1, by moving the shifter rod 9 to the right, as viewed in Figure 1, to bring the shiftable gear 72 into mesh with the idler 80. The drive then proceeds from driven shaft 1 through low speed pinion 31, low speed gear 48, lay shaft sleeve 40, lay shaft sleeve pinion 79, idler 80, gear 72, sleeve 67 and thence to the driven shaft 2.

For the emergency low, the gear shift lever at its lower end is swung sharply to the right, as viewed in Figure 4 to engage the ball 146 in the notch 149. Thereupon, the gear shift rod 8 is moved to the right, as viewed in Figure 1, this operating through the lever 88 and shifter finger 86 to slide the lay shaft sliding pinion 83 into mesh with the external gear 90 on the member 68. This provides a relatively large gear reduction as follows, from the driving shaft 1, low speed pinion 31, low speed gear 48, lay shaft sleeve 40, pinion 83, external gear 90 on the member 68, thence through the sleeve 67 and shaft 2.

In the operation of the shift lever to effect a connection and disconnection of the emergency low or other special connection, it is to be noted that when the plunger 151 has been forcibly retracted by the action of the lower end of the shift lever and shift rod 8 moved in the direction of the arrow indicated in Figure 5, thus causing a disalignment of pockets 149 and 141, the lever 140 will remain in the pocket 149 due to the engagement of the side of the lever opposite the plunger contacted side with the adjacent shift rod 9. Upon return of the end rod 8 to a position where the pockets 149 and 141 are again aligned, the lower end of the shift lever 140 will be ejected from the pocket 149 into pocket 141 by the normal projection of the plunger 151. Thus upon disengagement of the emergency low or other special connection by a return of the shift lever to neutral position, the lever is automatically adjusted for operation of the normal driving speeds.

In Figures 6 and 7 I have illustrated a modified form or adaptation of my invention. Referring more particularly to Figure 6, I have shown a fragmentary vertical axial section through the upper portion of a transmission housing 200 in which a suitable shift lever 201 is suitably supported for limited universal movement in any suitable or desired manner with the lower end 202 thereof extending downwardly into housing 200 for an appreciable distance.

A plurality of transmission shifter rods 208, 209 and 210 suitably disposed in the lower end of casing 200 are mounted in parallelism for axial movement. Rods 209 and 210 are adapted to control the usual normal operating gear connections of the transmission while rod 208 is adapted to control an extra or emergency low gear or other special connection. It might be here noted that the section shown in the instant figure is viewed in the opposite direction from the section illustrated in Figure 4 so that where the emergency low or other special connection control rod 8 is shown in the latter figure as being to the right in Figure 6 it is shown disposed to the left. Rods 208 and 210 each carry suitable brackets 211 and 212 respectively, secured thereto by means of set screws 213 and 214 respectively. The centrally disposed shifter rod 209 is also provided with a suitable bracket 215 secured thereto by means of a set screw 216. Bracket 215 extends upwardly and is provided centrally thereof with a reduced extension 217 providing a pair of shoulders 218 and 219 extending axially of the rod 209 for a purpose to be hereinafter described. Extension 217 is provided with a transverse pocket 220.

Brackets 211 and 212 are provided with lateral upwardly and inwardly directed extensions 221 and 222 respectively, the inner edges of which terminate in upwardly extending portions 223 and 224 respectively disposed in parallelism and flanking the centrally disposed extension 217 of bracket 215. Each of these extensions 223 and 224 is provided with a pocket 225 and 226 respectively. In the neutral position of the transmission, pockets 220, 225 and 226 are adapted to register in transverse alignment. Along the lower edges of extensions 221 and 222 are provided supporting ledges 228 and 229 respectively which are adapted to rest upon the corresponding shoulders 218 and 219 of the bracket 215 for sliding movement therealong.

The extreme lower end of shift lever 201 is provided with a laterally reduced portion 202′, the lateral dimension of which is equal to or slightly less than the transverse dimension of the extension 217 of bracket 215. The reduced portion 202′ is thus provided with two laterally disposed faces 203 and 204. This portion 202′ is adapted in the neutral position of the transmission to be disposed in the pocket 220, and in such position of the transmission may be laterally displaced for selective disposition in either of pockets 225 or 226. Adjacent the lower end 202 of lever 201 there is provided a lateral extension 205 disposed in parallel relation to the faces 203 and 204 of the portion 202', extension 205 extending in a direction opposite to the direction of axial movement of the shift rod 208. The purpose of such extension 205 will be hereinafter more fully described. This extension 205 is provided with a lateral face 206 a continuation of which across the corresponding face of the lower end 202 of the shift lever 201 defines a slight boss 206' on the lever. The free end of extension 205 is beveled on three sides as indicated at 207. The faces 206 and 206' form a continuous planar surface.

The side of casing 200 opposite the extension 205 on lever 201 is provided with a thickened portion 230 in the nature of a boss which is suitably drilled or cored to provide a core opening 231. A plunger casing 232 having an axial bore 233 therein is seated in the core opening 231 and is suitably secured in position by means of a set screw 234 threaded into a transverse threaded bore 235, set screw 234 being provided at its end with a conical tip 236 which takes into a radial opening 237 provided in casing 232. The inner end of casing 232 is provided with a reduced bore 238 forming a peripheral shoulder 239. A slidable plunger 240 is disposed axially in the bore 233 and is provided at one end with a reduced portion 241 which passes through the reduced bore 238 of the casing 232, the reduced end 241 providing a shoulder 242 which in the maximum projected position of the plunger 240 is adapted to engage the annular shoulder 239 of the casing 232 thereby limiting the projecting movement of the plunger. The main body portion of the plunger 240 is provided with an axial bore 243 in which a suitable coil spring 244 is seated, the outer end of the coil 244 being in abutment with the reduced end of a screw plug 245 suitably threaded into the outer end of bore 233 of casing 232.

Casing 232 is provided adjacent its outer end with a radially outwardly extending boss or projection 246 having a bore 247 provided therein by suitable drilling or boring of a diametrically disposed opening extending from the outer periphery of casing 232 in opposed relation to the projection or boss 246. A double acting catch comprising a ball 248 normally yieldingly projected radially toward this axis of casing 232 by means of a spring 249, is seated in the bore 247. Ball 248 is normally adapted to take into a peripheral groove 250 provided adjacent the outer end of plunger 240. A suitable screw plug 251 is threaded into the diametrically opposed portion of the bore 247 to permit of access to the ball 248 and spring 249 for removal or replacement thereof when necessary.

The plunger 240 and its casing 232 are so positioned that with the plunger in maximum projected position, the inner end of the reduced portion 241 will engage the planar surface 206, 206' to normally prevent lateral displacement of the lower end 202 of lever 201 in the direction of the pocket 225 of the bracket 211 of shift rod 208 which controls the emergency low or other special gear. It will be noted that the engagement of the ball 248 with the peripheral groove 250 at the outer end of the plunger 240 is such as to aid the spring 244 in maintaining the plunger in maximum projected position.

The operation of device disclosed in Figures 6 and 7 is similar to that of the device disclosed in Figures 4 and 5. Briefly, with the lower end 202 of the lever 201 in the position illustrated in Figure 6, the transmission is in neutral position. It will be readily apparent that the usual or normal operating speeds of the transmission may be readily attained by mere axial movement of the rods 209 and 210. When it is desired to employ the emergency low or other special gear, in view of the retarding tendencies of the ball 248, it is only necessary to move the upper end of the shift lever 201 sharply to the right (as viewed in Figure 6) thus imparting a sharp movement to the left of the lower end 202 of the lever 201. With the projection 202' of the lever 201 moved into the pocket 225 of the bracket 211 of shift rod 208, the rod 208 may be moved to suitably engage the emergency low or other special gear. With the rod in such shifted position the plunger 240 under the urging of spring 244 exerts a lateral pressure against the planar face 206, 206' thus forcing the face 204 of the projection 202' into engagement with the opposed lateral face of the projection 217 of bracket 215 secured to the shift rod 209. Thus the projection 217 serves to retain the projection 202' in the pocket 225 and against lateral displacement therefrom during the operative position of the rod 208. When the rod 208 is again shifted to the usual neutral position bringing the pocket 225 into alignment with the pocket 220, it will at once be seen that the plunger 240 will be effective to promptly displace the lower end 202 of the shift lever 201 laterally into the pocket 220.

It might here be mentioned that it is important to note that in the cases of both modifications disclosed in Figures 4 to 7, the inner ends of the plungers 151 and 240 in their maximum projected positions serve as lateral stops for the respective lower ends of the shift levers 140 and 201 so that an operator may readily position the lower ends of the shift levers in the pockets 141 or 220 of the first and reverse speed shift rods 9 and 209 respectively. The functions of the plungers 151 and 240 therefore are not limited to those of expelling the lower ends of the shift levers when the pockets of the shifter rods are aligned in neutral position and preventing the displacement of the levers into the pockets provided in the brackets of the emergency low or other special gear shift rods but also serve as indicators for informing an operator of such a transmission of the correct position of the shift levers for the engagement of the first and reverse shifter rods.

Coming now to Figures 8 and 9, I have illustrated a further modified application of my invention.

Referring more particularly to Figure 8, I have shown a vertical section through the upper portion of a transmission casing 300 provided with the usual upwardly extending hollow portion 301 in which a shift lever 302 is suitably mounted for limited universal movement in any desired manner. A plurality of shifter rods 308, 309 and 310 are suitably positioned for axial movement in parallel relation in the same manner as in the modification disclosed in Figures 6 and 7, such rods being provided with suitable brackets 311, 312 and 313 respectively of the same character as brackets 211, 215 and 212 of the modification disclosed in Figures 6 and 7, these brackets being provided with suitable pockets 314, 315 and 316 respectively. Pockets 314 and 316 instead of having limiting outer walls as in the case of the corresponding pockets shown in Figures 6 and 7 in the instant case extend transversely through the upper ends of the respective brackets. The lower end of shift lever 303 is provided with a reduced portion 303' formed by suitably slabbing off opposed lateral portions of the lower end of the lever 302, such reduced portion 303' being defined by lateral faces 306 and 307. The lateral face 307 is provided centrally thereof with a vertically extending groove or notch 305 the purpose of which will be hereinafter more specifically described.

The lateral side walls of the casing 300 are provided with thickened or boss portions 317 and 318 which are provided with aligned bores 319 and 320 respectively suitably formed therein by drilling or coring. Bore 320 is adapted to slidably accommodate therein a plunger 321 which is provided with an internal bore 322 serving as a seat for one end of a coil spring 323, the other end of the coil spring being adapted to abut the inner end of a screw plug 324 suitably threaded into the outer end of bore 320, the plug 324 being retained against accidental displacement by a suitable lock washer 325 positioned between the head of the plug and the corresponding outer wall of the casing 300. The inner end of the plunger 321 is conical in configuration and in the normal neutral position of the transmission such conical end 326 is adapted to take into the groove or notch 305 in the face 307 of the lower end 303 of shift lever 302.

Bore 319 likewise accommodates the slidable plunger 327 provided with an axial bore 328 which is adapted to seat a coil spring 329, the outer end of which abuts the inner end of a screw plug 330 suitably threaded into the outer end of bore 319 and retained against accidental displacement by a suitable lock washer 331 interposed between the head of the plug 330 and the adjacent outer face of the casing 300. The inner or effective end of the plunger 327 is also provided with a tip of conical configuration and this conical end 332 is adapted in the normal neutral position of the transmission to abut against the face 306 of the projection 303' of the lever 302. A double acting catch or holder comprising a ball 333 yieldingly urged radially inwardly of the bore 319 by means of a coil spring 334 is positioned in a radially extending bore 335 provided in the enlarged portion 317, the spring 334 being retained by having abutting engagement with the end of a screw plug 336 suitably threaded into the upper end of the bore 335 and retained against accidental displacement by means of a suitable lock washer 337. Ball 333 is urged into engagement with a relatively wide peripheral groove 338 provided on the plunger 327. The width of the groove 338 is such as to permit of further projection of the plunger 327 inwardly of the casing 300 a predetermined distance when the projection 303' of shift lever 302 is moved laterally into engagement in the pocket 316.

Referring now more particularly to Figure 9, it will be noted that bracket 311 is provided along its outer face with a suitable notch 339. Bracket 313 is suitably provided with a pair of notches 340 and 341, and bracket 312 is provided with pairs of opposed notches 342 and 343. All of these notches are in the same plane and are adapted to be correspondingly engaged by the conical ends 332 and 326 of the plungers 327 and 321 respectively.

The springs 329 and 323 are of such strength as to normally retain the projection 303' of the lever 302 in the pocket 315 of bracket 312 in the normal neutral position of the transmission. It will be noted that in such position of the transmission, the ball 333 is in engagement with the right hand shoulder (as viewed in Figure 8) of the groove 338 thereby normally restraining movement of the plunger 327 to the left.

In operation, when it is desired to operatively position the transmission for operation in either first or reverse, the bracket 312 and its corresponding shifter rod 309 may be axially moved by means of movement of the lever 302. At this time if the bracket 312 is moved upwardly as viewed in Figure 9 the conical ends of the plungers 327 and 321 will engage in the notches 342 thereby normally retaining the bracket 312 in such adjusted position until it is again forcibly moved in the opposite direction. If moved downwardly as viewed in Figure 9, the same condition will occur, this time the ends of the plungers engaging in the notches 343. When it is desired to operatively position the transmission in either second or third speeds the portion 303' of the shift lever 302 may be forcibly moved from pocket 315 into the pocket 316 of the bracket 313 and such bracket and its corresponding shifter rod 310 then axially moved to the desired position. When the bracket 313 is so moved, it will be readily apparent that the conical end of plunger 321 will engage in either of the notches 340 or 341 depending upon the directional movement of the shifter rod 310. When it is desired to place the transmission in operative condition of the emergency low or other special speed, a quick movement of the projection 303' laterally in the direction of plunger 327 to overcome the frictional engagement between the ball 333 and the adjacent shoulder formed by the peripheral groove 338, will position the projection 303' in the pocket 314 of the bracket 311. Upon movement of such bracket and its corresponding shifter rod 308 in the proper direction, for example, upwardly as viewed in Figure 9, the conical end of plunger 327 will engage in the notch 339.

It will thus be seen that in the case of the instant modification the two plungers 327 and 321 will act as suitable interlocks for the transmission shifter rods 308, 309 thus preventing accidental axial displacement of such rods and consequently of the corresponding shifter forks due to vibration or rocking movement of the vehicle to which the transmission is applied.

It is to be noted that in the neutral position of the transmission as it is shown in Figures 8 and 9, the plungers 327 and 321 pass through the pockets 314 and 316 respectively thereby effectively positively locking the shifter forks 308 and 310 respectively from axial displacement until such displacement is desired by the operator of the vehicle in which case the projection 303' must first be positively and firmly moved to the proper pocket for such displacement. Any lateral displacement of the projection 303' into for example pocket 314 permits the plunger 321 to move through the pocket 316 and into the pocket 315, so that when the transmission is in the condition for effectively accomplishing engagement of the emergency low or other special gear both shifter rods 309 and 310 are positively locked against accidental displacement. Due to the substantial width of the peripheral groove 338 thereby permitting of further inward movement of the plunger 327, it will at once be apparent that when the projection 303' is moved from pocket 315 to pocket 316, plunger 327 will automatically follow the movement of such projection 303' passing through the pocket 314 and into the pocket 315 while the bracket 313 is being moved or retained in such adjusted position as is desired. Thus when the shifter rod 310 is being actuated the plunger 327 effectively positively locks the shifter rods 308 and 309 from accidental displacement. Thus it will be seen that in the instant modified embodiment of the invention the plungers employed perform two additional functions in that they serve to positively lock such shifter rods as are not employed against accidental displacement and in addition serve as suitable interlocks for the transmission shifter rods to yieldingly retain such shifter rod as is displaced against accidental reverse displacement due to vibration of a vehicle to which the transmission is applied or to the pulsations of the usual motor employed to furnish the motive power.

As in the case of the previous modifications disclosed, it will be readily apparent that when the lower end or projection 303' of the shift lever 302 is brought to a position causing the alignment of pockets 314, 315 and 316, the two plungers 327 and 321 will automatically position the shift lever 302 in neutral position. Inasmuch as the plunger 327 is yieldingly retained against outward movement by means of the ball 333 cooperating with groove 338, it will be clear that a more substantial pressure must be applied by an operator upon the upper end of shift lever 302 to move the projection 303' of the lever into the pocket 314 of bracket 311 secured to shifter rod 308 for accomplishing the emergency low or other special speed connection.

Thus the various preferred forms disclosed herein embodying the salient features of the present invention readily lend themselves to simple and easy operation with no unnecessary variation from the usual well known transmission types now in general use as regards the normal operating speeds. As has hereinbefore been stated, the shifter rods may be so arranged as to provide a special high speed in place of an emergency low speed embodying the salient features of the present invention.

While I have shown several preferred embodiments of my invention, I do not wish to be limited thereto. As will be understood by those skilled in the art, changes may be made therein without departing from the essence of the invention or the spirit and scope of the appended claims.

What I claim and desire to secure by Letters Patent is:

1. In combination, a pair of shifter rods, one of said rods having a pocket for receiving the end of a shift lever, the other of said rods having means for receiving the end of the shift lever, means for yieldingly restraining movement of the end of said shift lever into said shift lever receiving means, and means for holding said yielding means against yielding.

2. In combination, a pair of shifter rods, one of said rods having a pocket for receiving the end of a shift lever, the other of said rods having means for receiving the end of the shift lever, and means for yieldingly holding the end of the shift lever out of said shift lever receiving means, and means for releasably holding said yielding means, whereby said yielding means is normally restrained from yielding but is adapted to be displaced by a sharp movement of the lower end of said shift lever thereagainst.

3. In combination with a gear shift lever mounted for limited universal motion in a casing, a pair of shifter rods, one of said rods having a pocket for receiving the end of the gear shift lever, the other of said rods having means for receiving the end of said gear shift lever, means associated with said casing for yieldingly restraining movement of the end of said gear shift lever into said receiving means on said second named rod, and means for releasably holding said restraining means against yielding.

4. In combination with a gear shift lever mounted for limited universal motion in a casing, a pair of shifter rods, one of said rods having a pocket for receiving the end of the gear shift lever, the other of said rods having means for receiving the end of said gear shift lever, means associated with said casing for restraining movement of the end of said gear shift lever into said receiving means on said second named rod, and means for releasably holding said restraining means against yielding said holding means being adapted to be forcibly displaced by said shift lever.

5. In combination, a pair of shifter rods each having pockets for receiving the lower end of a shift lever, yieldable means adapted to resist movement of the end of said shift lever into one of said pockets when said pockets are aligned, and means for releasably holding said means in resisting position, said means being adapted to be displaced by forcible movement of the end of said shifter lever into said pocket, said shift lever being retained in said pocket upon disalignment of said pockets, said means being also effective to eject the end of said shift lever when said pockets are again aligned.

6. In combination with a gear shift lever mounted for limited universal movement, a pair of shifter rods each having a pocket for selective reception of one end of said shift lever, means comprising a double acting plunger adapted to yieldingly restrain movement of said end of said shift lever into one of said pockets, and means adapted to engage said plunger to yieldingly retain said plunger in a predetermined projected position, said last named means being adapted to be rendered ineffective to retain said plunger upon forcible retraction of said plunger.

7. In combination with a gear shift lever mounted for limited universal movement, a pair of shifter rods each having a pocket for selective reception of one end of said shift lever, means comprising a double acting plunger adapted to yieldingly restrain movement of said end of said shift lever into one of said pockets, a depression in said plunger, and a spring pressed detent adapted to seat in said depression to yieldingly retain said plunger in a predetermined projected position, said spring pressed detent being adapted to be unseated from said depression upon forcible retraction of said plunger.

8. In combination with a gear shift lever mounted for limited universal motion, a pair of shifter rods, one of said rods having a pocket for receiving the end of the shift lever, a bracket on the other shifter rod also containing a pocket for receiving the end of the shift lever, a spring pressed plunger mounted in the bracket for holding the end of the shift lever out of said latter pocket, and a yielding detent for holding the spring plunger.

9. In combination, a pair of shifter rods, one of said rods having means providing a pocket for receiving the end of a shift lever, the other rod having a bracket containing a pocket for receiving the end of the shift lever and a spring plunger mounted in said bracket and extending in the direction of the pocket for holding the end of the shift lever out of said pocket, and a spring detent for holding the plunger against yielding.

10. In combination, a shifter rod, a bracket secured thereto, said bracket having a recess extending laterally thereinto and having a transverse bore, a spring plunger mounted in said bore, said plunger having a stop for limiting its outward motion, a spring for the plunger, a recess in the side wall of the spring plunger, a spring pressed detent adapted to seat in said recess, and means for guiding the plunger so that the recess will remain in line with the detent.

11. In combination, a shift lever, a shifter rod, a bracket secured thereto, said bracket having a recess extending laterally thereinto for receiving the lower end of said shift lever and having a transverse bore, a spring plunger mounted in said bore, said plunger having a stop for limiting its outward motion, a spring for the plunger, a conical recess in the side wall of the plunger, a spring pressed detent having a conical head adapted to seat in said recess, and means for guiding the plunger so that the recess will remain in line with the detent, said detent being adapted to be unseated from said recess upon forcible retraction of said plunger by a sharp movement of the lower end of said shift lever.

12. In combination, a casing, a shift lever mounted for limited universal movement in said casing, a pair of shifter rods each having a pocket for selective reception of one end of said shift lever, means associated with said casing adapted to yieldably resist movement of the end of said shift lever into one of said pockets when said pockets are aligned, and means releasably holding said means in resisting position, said holding means being adapted to be displaced by forcible movement of the end of said shift lever into said last named pocket.

13. In combination, a casing, a shift lever mounted for limited universal movement in said casing, a pair of shifter rods each having a pocket for selective reception of one end of said shift lever, a transverse bore in said casing, a second casing supported in said bore, a spring pressed plunger in said second casing and extending beyond one end thereof for engaging said shift lever, and a spring pressed detent adapted to engage said plunger to retain said plunger in a predetermined projected position to restrain movement of said shift lever into one of said pockets, said spring pressed detent being adapted to be disengaged from said plunger upon forcible retraction of the plunger by a quick movement of the end of the lever into said pocket.

14. In combination, a casing, a shift lever mounted for limited universal movement in said casing, a pair of shifter rods each having a pocket for selective reception of one end of said shift lever, a transverse bore in said casing, a second casing supported in said bore, a spring pressed plunger in said second casing and extending beyond one end thereof for engaging said shift lever, a spring pressed detent adapted to engage said plunger to retain said plunger in a predetermined projected position to restrain movement of said shift lever into one of said pockets, said spring pressed detent being adapted to be disengaged from said plunger upon forcible retraction of the plunger by a quick movement of the end of the lever into said pocket, and a projection extending from said shift lever in line with the plunger and adapted to have continuous engagement with said plunger.

15. In combination with a gear shift lever mounted in a casing for limited universal movement, a plurality of shifter rods each having a pocket for receiving one end of said shift lever, yieldable means associated with said casing and normally adapted to urge said lever to neutral position into one pocket, said means extending through another pocket to positively lock the corresponding shifter rod against axial movement, and means for releasably restraining displacement of said yieldable means.

16. In combination with a gear shift lever mounted in a casing for limited universal movement, a plurality of shifter rods each having a pocket for receiving one end of said shift lever, a plurality of yieldable means associated with said casing and normally urging said lever to neutral position into one pocket, said means extending through the other pockets to positively lock their corresponding shifter rods against axial movement, and means releasably cooperating with one of said yieldable means to normally restrain displacement thereof.

17. In combination with a gear shift lever mounted in a casing for limited universal movement, a plurality of shifter rods each having a pocket for selective reception of one end of said shift lever, said end of said lever being adapted to engage in one of said pockets in neutral position of said shifter rods, a plurality of spring pressed plungers engaging said shift lever and extending through the other of said pockets to positively retain the corresponding shifter rods against axial movement, and a plurality of notches in one of said shifter rods adapted to be selectively engaged by said plungers upon axial displacement of the corresponding shifter rod whereby said plungers are effective as interlocking means.

18. In combination with a gear shift lever mounted in a casing for limited universal movement, a plurality of shifter rods each having a pocket for selective reception of one end of said shift lever, said end of said lever being adapted to engage in one of said pockets in neutral position of said shifter rods, a plurality of spring pressed plungers engaging said shift lever and extending through the other of said pockets to positively retain the corresponding shifter rods against axial movement, and yieldable means associated with one of said plungers adapted to retain said one of said plungers in a predetermined projected position, said means being adapted to be rendered ineffective upon forcible retraction of that plunger.

19. In combination with a gear shift lever mounted for limited universal movement, a plurality of shifter rods including one for controlling an emergency low or other special gear, each having a pocket for selective reception of one end of said lever, plungers yieldingly engaging opposed sides of said lever when said pockets are aligned, one of said plungers extending through the pocket of the shifter rod controlling the emergency low or other special gear, the other extending through the pocket of one of the others of said shifter rods whereby such rods are positively locked against axial movement, and double acting means cooperating with the first named plunger for releasably restraining displacement thereof.

20. In combination with a gear shift lever mounted for limited universal movement, a plurality of shifter rods including one for controlling an emergency low or other special gear, each having a pocket for selective reception of one end of said lever, plungers yieldingly engaging opposed sides of said lever when said pockets are aligned, one of said plungers extending through the pocket of the shifter rod controlling the emergency low or other special gear, the other extending through the pocket of one of the others of said shifter rods whereby such rods are positively locked against axial movement, and yieldable means associated with one of said plungers to retain it in a predetermined projected position, said means being adapted to be rendered ineffective upon forcible retraction of its plunger.

21. In combination, in a transmission, a casing, a gear shift lever mounted in said casing for limited universal movement, three shifter rods associated with said casing, one of said rods being adapted to control an emergency low or other special gear, brackets secured to each of said rods and each provided with a transverse pocket adapted to be brought into alignment in the neutral position of the transmission, one end of said lever extending into the range of said pockets and being adapted to be selectively engaged therein, a pair of opposed plungers carried by said casing and adapted to engage opposite sides of said shift lever in the neutral position thereof in the pocket of the middle rod bracket, said plungers being adapted to extend through the pockets of the brackets flanking said middle bracket whereby said flanking brackets and their corresponding rods are locked against axial movement during axial movement of said middle rod, one of said plungers being freely displaceable by simple lateral shifting of the lower end of said shift lever, and releasable means cooperating with the other plunger for normally restraining displacement thereof, said last named plunger being displaceable only by forcible lateral movement of the lower end of the shift lever.

22. In combination, in a transmission, a casing, a gear shift lever mounted in said casing for limited universal movement, three shifter rods associated with said casing, one of said rods being adapted to control an emergency low or other special gear, brackets secured to each of said rods and each provided with a transverse pocket adapted to be brought into alignment in the neutral position of the transmission, one end of said lever extending into the range of said pockets and being adapted to be selectively engaged therein, and a pair of opposed plungers carried by said casing and adapted to engage opposite sides of said shift lever in the neutral position thereof in the pocket of the middle rod bracket, said plungers being adapted to extend through the pockets of the brackets flanking said middle bracket whereby said flanking brackets and their corresponding rods are locked against axial movement during axial movement of said middle rod, said middle bracket having a plurality of opposed notches adapted to be engaged by said plungers in the shifted positions of said middle rod.

23. In combination, in a transmission, a casing, a gear shift lever mounted in said casing for limited universal movement, three shifter rods associated with said casing, one of said rods being adapted to control an emergency low or other special gear, brackets secured to each of said rods and each provided with a transverse pocket adapted to be brought into alignment in the neutral position of the transmission, one end of said lever extending into the range of said pockets and being adapted to be selectively engaged therein, and a pair of opposed plungers carried by said casing and adapted to engage opposite sides of said shift lever in the neutral position thereof in the pocket of the middle rod bracket, said plungers being adapted to extend through the pockets of the brackets flanking said middle bracket whereby said flanking brackets and their corresponding rods are locked against axial movement during axial movement of said middle rod, each of said plungers being effective to positively lock one of the flanking rods and to yieldingly lock the middle rod when the middle rod is displaced from neutral position.

24. In combination, in a transmission, a casing, a gear shift lever mounted in said casing for limited universal movement, three shifter rods associated with said casing, one of said rods being adapted to control an emergency low or other special gear, brackets secured to each of said rods and each provided with a transverse pocket adapted to be brought into alignment in the neutral position of the transmission, one end of said lever extending into the range of said pockets and being adapted to be selectively engaged therein, and a pair of opposed plungers carried by said casing and adapted to engage opposite sides of said shift lever in the neutral position thereof in the pocket of the middle rod bracket, said plungers being adapted to extend through the pockets of the brackets flanking said middle bracket whereby said flanking brackets and their corresponding rods are locked against axial movement during axial movement of said middle rod, each of said plungers being effective to lock one of the flanking rods and the middle rod when one of the plungers is forcibly retracted out of the pocket of the other flanking rod, each of said flanking brackets having a notch therein adapted to be engaged by the retracted plunger to provide an interlock for its corresponding rod, and said middle bracket having opposed notches adapted to be engaged by said plungers when said middle rod is shifted.

25. In combination, in a transmission, a casing, a gear shift lever mounted in said casing for limited universal movement, three shifter rods associated with said casing, one of said rods being adapted to control an emergency low or other special gear, brackets secured to each of said rods and each provided with a transverse pocket adapted to be brought into alignment in the neutral position of the transmission, one end of said lever extending into the range of said pockets and being adapted to be selectively engaged therein, a pair of opposed plungers carried by said casing and adapted to engage opposite sides of said shift lever in the neutral position thereof in the pocket of the middle rod bracket, said plungers being adapted to extend through the pockets of the brackets flanking said middle bracket whereby said flanking brackets and their corresponding rods are locked against axial movement during axial movement of said middle rod, and means associated with the plunger effective to lock the emergency low or other special gear controlling rod to retain such plunger in a predetermined projected position in the neutral position of said rods, said means being adapted to be rendered ineffective upon forcible retraction of its plunger by said shift lever.

In witness whereof, I have hereunto subscribed my name this 23rd day of June, 1930.

ROBERT LAPSLEY.